(12) United States Patent
Jiang et al.

(10) Patent No.: US 10,557,504 B1
(45) Date of Patent: Feb. 11, 2020

(54) LINEAR GUIDEWAY CAPABLE OF DETECTING ABNORMAL CIRCULATION STATE

(71) Applicant: HIWIN TECHNOLOGIES CORP., Taichung (TW)

(72) Inventors: Zong-Sian Jiang, Taichung (TW); Chen-Hao Chang, Taichung (TW); Lung-Yu Chang, Taichung (TW); Yeh-Wei Lin, Taichung (TW); Chia-Yu Lin, Taichung (TW); Pin-Ju Huang, Taichung (TW); Stephanie Chun-Ming Yang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 16/253,764

(22) Filed: Jan. 22, 2019

(51) Int. Cl.
*F16C 41/00* (2006.01)
*F16C 29/06* (2006.01)
*F16C 29/00* (2006.01)

(52) U.S. Cl.
CPC ............ *F16C 41/00* (2013.01); *F16C 29/005* (2013.01); *F16C 29/0609* (2013.01); *F16C 29/0685* (2013.01); *F16C 2233/00* (2013.01)

(58) Field of Classification Search
CPC .... F16C 41/00; F16C 29/005; F16C 29/0609; F16C 29/0633; F16C 29/06; F16C 29/0685; F16C 2233/00; F16C 2322/39; F16C 29/0645
USPC .......................................... 384/8, 43, 45, 50
See application file for complete search history.

(56) References Cited

U.S. PATENT DOCUMENTS

| 7,178,981 | B2 * | 2/2007 | Rudy | F16C 29/0609 384/45 |
| 7,263,901 | B2 * | 9/2007 | Pecher | G01P 3/44 384/50 |
| 8,689,643 | B2 * | 4/2014 | Grab | G01L 3/102 73/862.335 |
| 9,188,164 | B2 * | 11/2015 | Huag | F16H 25/2214 |
| 2007/0237435 | A1 * | 10/2007 | Nagao | F16C 29/043 384/44 |

(Continued)

FOREIGN PATENT DOCUMENTS

| DE | 19713688 A1 * | 10/1998 | ............. F16C 19/52 |
| DE | 19742081 A1 * | 3/1999 | ............. F16C 29/00 |

(Continued)

*Primary Examiner* — Marcus Charles
(74) *Attorney, Agent, or Firm* — Muncy, Geissler, Olds & Lowe, P.C.

(57) ABSTRACT

A linear guideway includes a rail, a slider disposed on the rail, and a load passage formed between the rail and the slider. The slider has two non-load passages penetrating through two opposite end surfaces of the slider. Each of two ends of each non-load passage is provided with a force sensor. Two end caps are disposed on two opposite end surfaces of the slider respectively and each have two circulation grooves. Each circulation groove is connected to an end of the load passage and an end of the non-load passage to form a circulation channel for balls to move therein. As a result, the linear guideway of the present invention employs force sensors to sense the force-receiving state of two ends of the non-load passages when they are impacted by the balls, so that it can be determined that if the balls have an abnormal pressing state.

4 Claims, 6 Drawing Sheets

(56) References Cited

U.S. PATENT DOCUMENTS

| | | | | |
|---|---|---|---|---|
| 2017/0356817 A1* | 12/2017 | Bluemm | ............ | F16C 29/0645 |
| 2018/0264614 A1* | 9/2018 | Winkelmann | ..... | B23Q 17/0966 |
| 2019/0024713 A1* | 1/2019 | Hoshide | ................. | F16C 29/06 |

FOREIGN PATENT DOCUMENTS

| | | | | |
|---|---|---|---|---|
| DE | 19941587 A1 * | 3/2001 | ............ | F16C 29/005 |
| DE | 19713688 B4 | 7/2009 | | |
| DE | 102016203952 A1 * | 9/2017 | .......... | F16C 29/0609 |
| DE | 102016205575 A1 | 10/2017 | | |
| GB | 2193812 B * | 5/1990 | .............. | F16C 29/00 |
| WO | WO 2018092498 A1 * | 5/2018 | .............. | F16C 29/06 |

\* cited by examiner

LINEAR GUIDEWAY CAPABLE OF DETECTING ABNORMAL CIRCULATION STATE

BACKGROUND OF THE INVENTION

1. Field of the Invention

The present invention relates to linear guideways and more particularly, to a linear guideway capable of detecting an abnormal circulation state.

2. Description of the Related Art

The traditional linear guideway includes a rail and a slider slidably mounted on the rail, wherein the slider is provided at each of the front and rear ends thereof with an end cap in a way that the rail, the slider and the two end caps collectively form a pair of circulation channels therebetween for a plurality of balls to move therein.

For ensuring smooth motion of the balls, there have been related prior arts employing different kinds of sensors to sense if there is an abnormal circulation state. For example, in German Patent No. DE 19713688B4, the sensor is disposed in the load passage to sense the moving distance of the slider or nut. in German Patent No. DE 102016205575A1, the sensor for sensing the preload is disposed at the cantilever portion of the load path. However, because there exists the preload between the slider and the rail, the ball jam problem is basically improbable to happen on the load path. Therefore, the abnormal circulation state is hard to be sensed in real time by the sensor installed on the load path such as that in the two above-mentioned patents.

SUMMARY OF THE INVENTION

It is a primary objective of the present invention to provide a linear guideway which can detect if the motion of the balls has an abnormality in real time.

To attain the above-mentioned primary objective, the linear guideway of the present invention includes a rail, a slider, two end caps, a plurality of balls, and a plurality of force sensors. The rail is provided on the peripheral surface thereof with two external roll grooves opposite to each other. The slider has a slide groove and is slidably disposed on the rail through the slide groove. The slide groove is provided on the inner wall thereof with two internal roll grooves opposite to each other. The internal roll grooves of the slider are corresponding to the external roll grooves of the rail respectively so that a load passage is formed between each internal roll groove and the external roll groove located correspondingly thereto. Besides, the slider further has two non-load passages opposite to each other. Each of the non-load passages penetrates through two opposite end surfaces of the slider. The two end caps are disposed on two opposite end surfaces of the slider and each provided with two circulation grooves. Two ends of each of the circulation grooves of each of the end caps are communicated with an end of one the load passage and an end of one the non-load passage respectively in a way that two circulation channels are formed and each of the circulation channels is formed by two the circulation grooves, one the load passage and one the non-load passage collectively, for the balls to move in the circulation channels. The force sensors are disposed at two ends of the two non-load passages in a paired manner for sensing the force-receiving state of the two non-load passages when the two non-load passages are impacted by the balls.

Because the ball jam condition relatively more often happens at the turning points of the circulation channels, the linear guideway of the present invention is provided at each of two ends of each of the non-load passages with at least one the force sensor. Through the force-receiving signals sensed at two ends of each of the non-load passages by the force sensors, it can be effectively determined in real time that if there is an abnormal circulation state.

On the other hand, each of the force sensors can be installed at various positions according to the practical demands. For example, each of the force sensors can be disposed on the external peripheral surface of a circulation pipe which is inserted in one the non-load passage and an end of the circulation pipe is communicated with one the circulation groove of each of the end caps. Alternatively, each of the force sensors can be embedded in an embedding trough which is provided on the inner wall of each of the non-load passages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1:
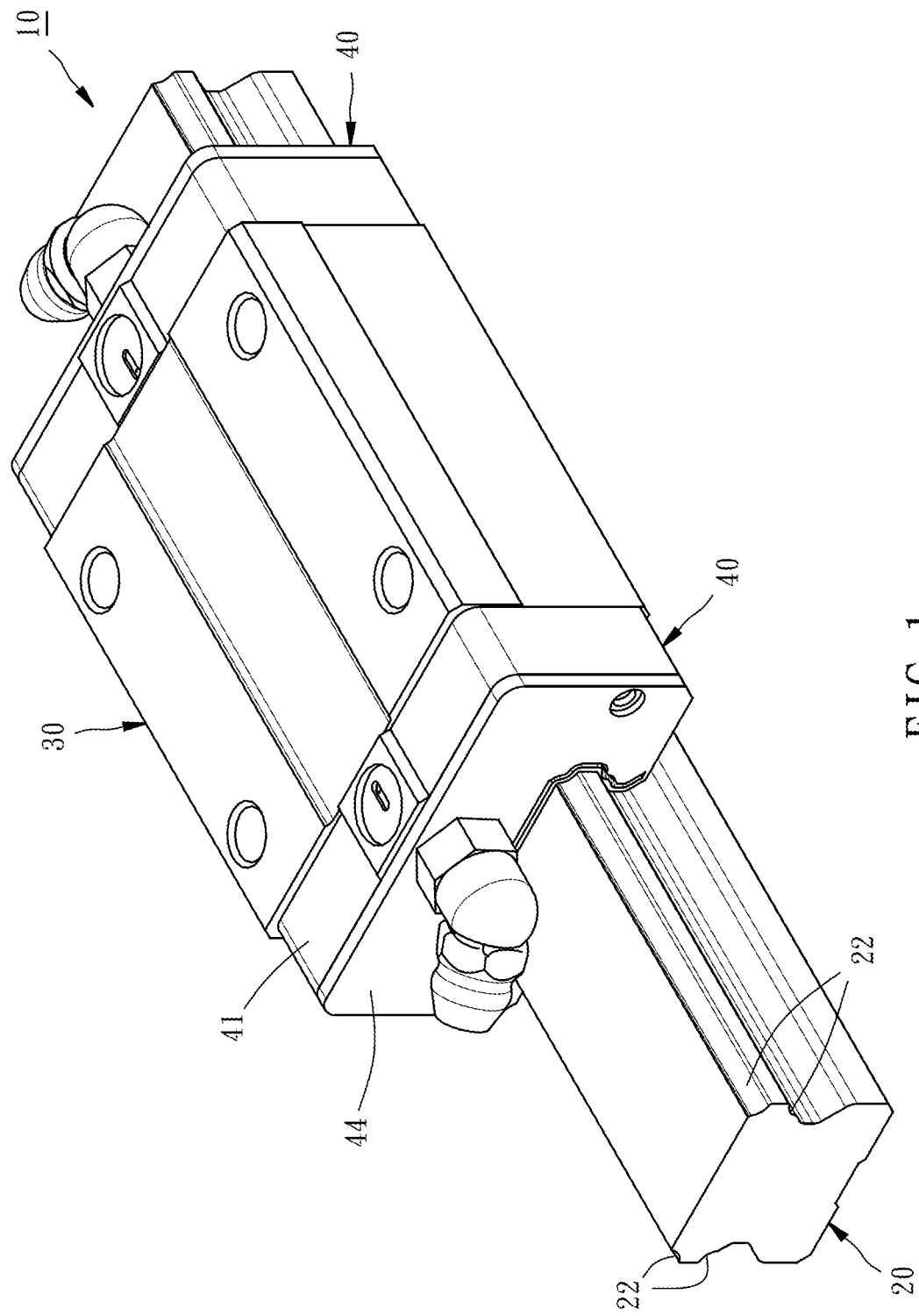
FIG. 1 is a perspective view of the appearance of a linear guideway of a first embodiment of the present invention.

First of all, it is to be mentioned that same reference numerals used in the following embodiments and the appendix drawings designate same or similar elements or structural features thereof throughout the specification for the purpose of concise illustration of the present invention.

Figure 2:
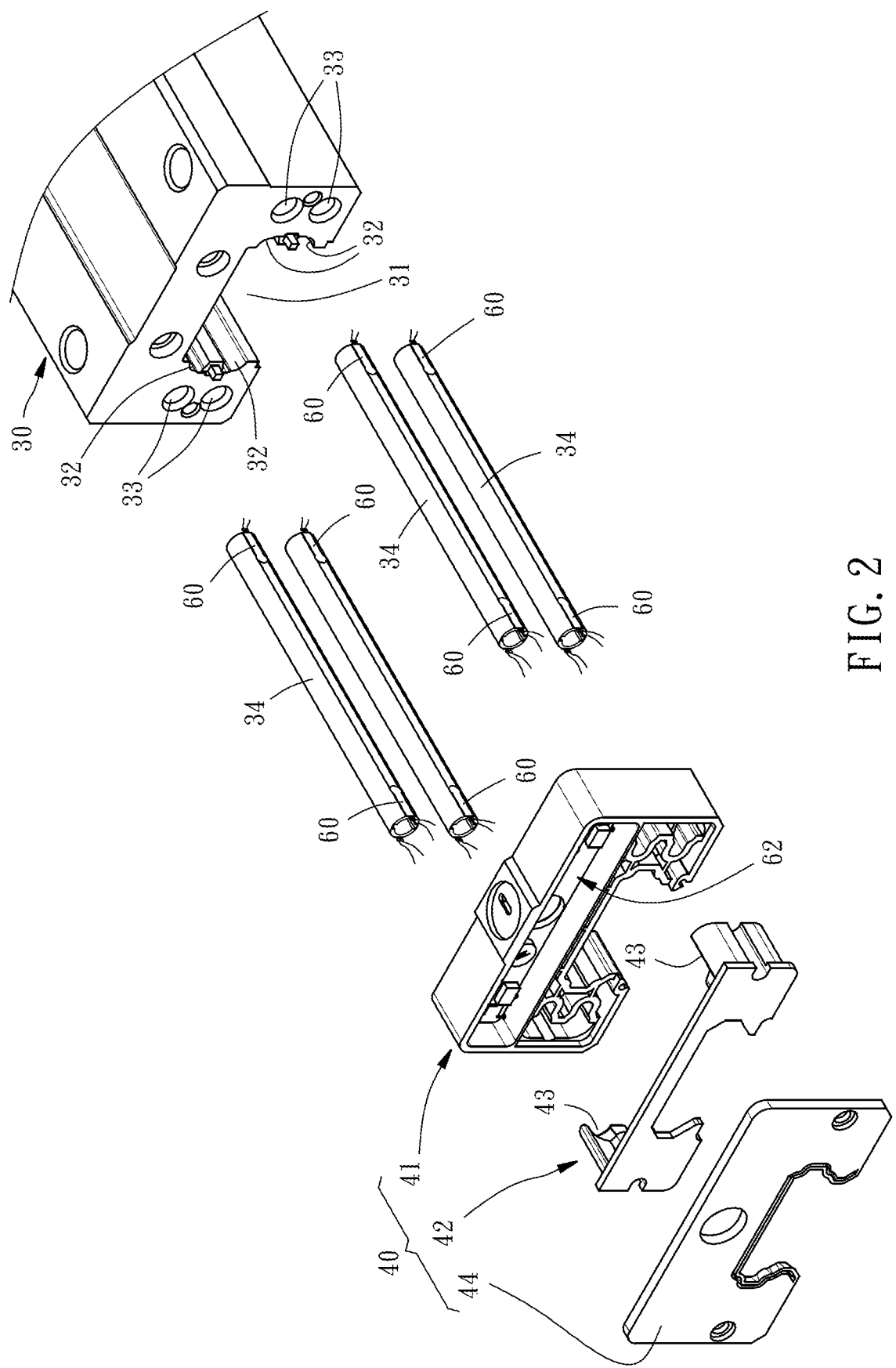
FIG. 2 is a partial exploded perspective view of the linear guideway of the first embodiment of the present invention, but not showing a rail thereof.

Referring to FIGS. 1 and 2, the linear guideway 10 of the first embodiment of the present invention includes a rail 20, a slider 30, two end caps 40, and a plurality of force sensors 60.

The rail 20 is provided on each of two opposite sides thereof with two external roll grooves 22 located one above the other.

Figure 3:
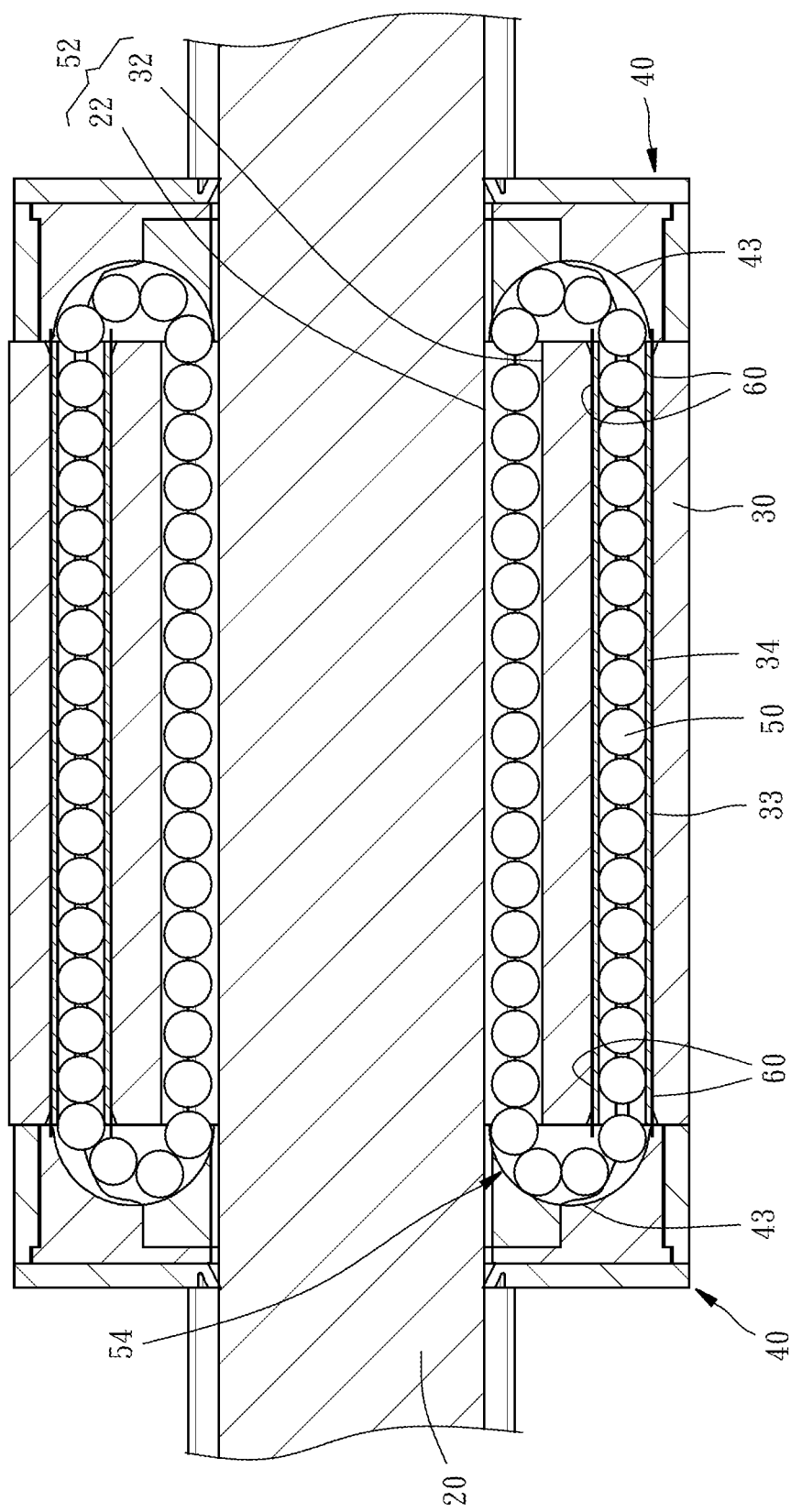
FIG. 3 is a sectional view of the linear guideway of the first embodiment of the present invention.

The slider 30 has a slide groove 31 and is disposed on the rail 20 through the slide groove 31 in a way that the slider 30 is slidable along the rail 20. The slide groove 31 of the slider 30 is provided on each of two opposite sides of the inner wall thereof with two internal roll grooves 32 located one above the other. The internal roll grooves 32 of the slider 30 are located correspondingly to the external roll grooves 22 of the rail 20, so that a load passage 52 as shown in FIG. 3 is formed between each internal roll groove 32 and the external roll groove 22 located correspondingly thereto. Besides, the slider 30 is provided on each of two opposite outsides of the slide groove 31 with two non-load passages 33 located one above the other. Each of the non-load passages 33 penetrates through the front and rear end surfaces of the slider 30.

The two end caps 40 are installed on the front and rear end surfaces of the slider 30. Because the two end caps 40 are identical, only one of them is illustrated in the following. As shown in FIG. 2, the end cap 40 has a base 41, a circulation member 42 and a covering plate 44. The base 41 is abutted on the end surface of the slider 30. The circulation member 42 is embedded in the base 41. The internal end surface of the circulation member 42 is provided on each of two opposite sides thereof with two circulation grooves 43 located one above the other. Two ends of each circulation groove 43 are communicated with the load passage 52 and the non-load passage 33 respectively in a way that two circulation grooves 43 located correspondingly to each other and one in front of the other, a load passage 52 and a non-load passage 33 collectively form a circulation channel 54 for a plurality of balls 50 to move therein, as shown in FIG. 3. The covering plate 44 is disposed on the external end surface of the base 41 in a way that the covering plate 44 together with the base 41 are installed on the slider 30 by fasteners such as screws (not shown) and the covering plate 44 covers the circulation member 42.

Figure 4:
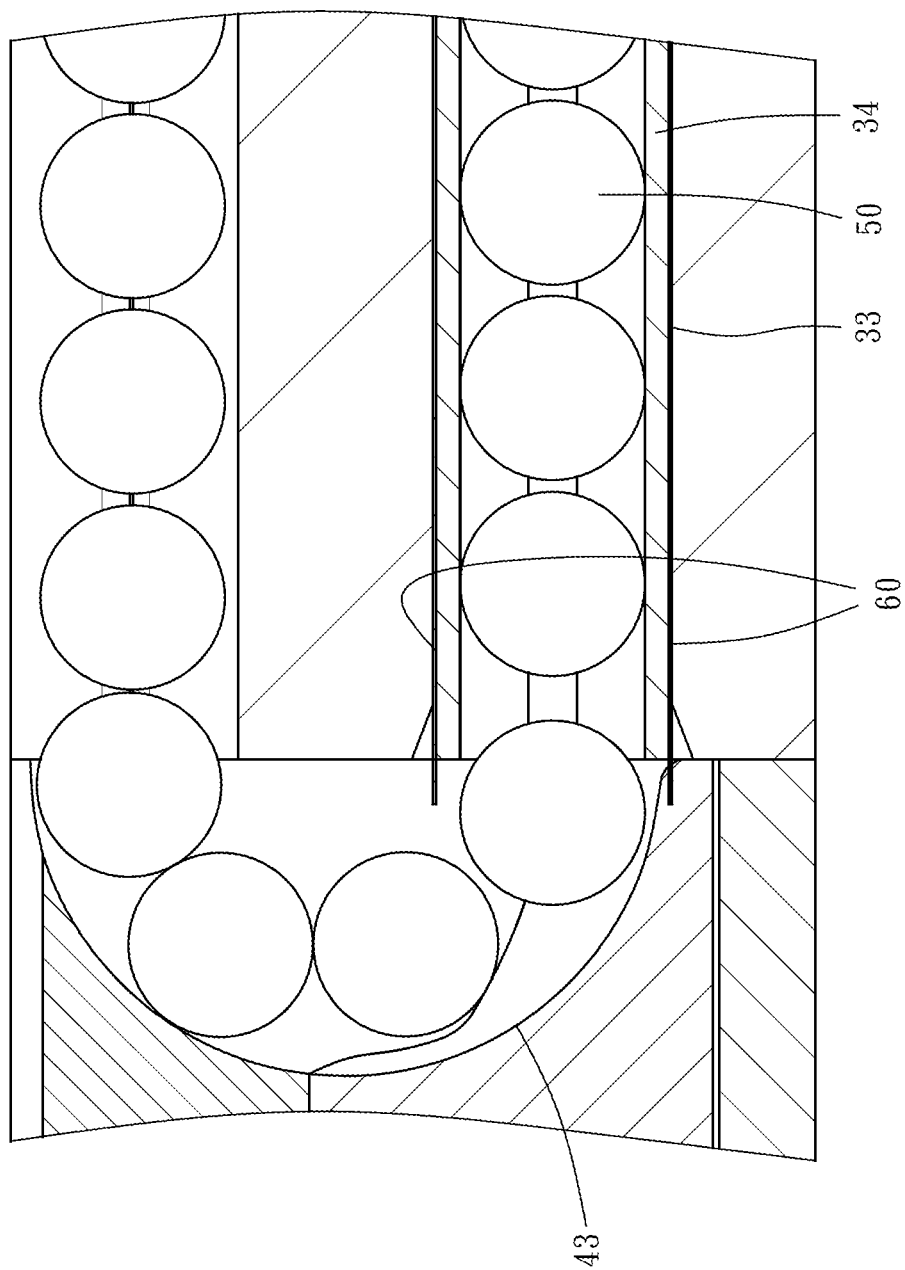
FIG. 4 is a partial enlarged view of FIG. 3.

There are sixteen force sensors 60 disposed in a paired manner. In this embodiment, as shown in FIGS. 2-4, each of the non-load passages 33 is provided with a circulation pipe 34 stuffed thereinto. Each of two ends of each circulation pipe 34 is connected to an end of a circulation groove 43. Besides, each end of each circulation pipe 34 is provided on the external peripheral surface thereof with a pair of force sensors 60. In this way, when the non-load passages 33 are impacted by the balls 50, the force-receiving state of the non-load passages 33 can be sensed by the force sensors 60 in real time.

Because the ball jam problem relatively more often happens at the turning points of the circulation channels 54, i.e. two ends of the non-load passages 33, the force sensors 60 installed at the positions as described above is relatively more liable to sense the force-receiving signal increasing abnormally. Once the force-receiving signal increases abnormally, it means the inner wall is impacted by the balls 50. At this time, the force-receiving signal sensed by the force sensor 60 will be transmitted to a control module 62 disposed in the base 41 for analysis, through that it can be pre-diagnosed that if there will be a circulation problem. Preferably, each force sensor 60 is positioned with a distance from an end opening of one non-load passage 33 and the distance is equal to or less than double of the diameter of the ball 50. In other words, the distance between each force sensor 60 and an end opening of one non-load passage 33 doesn't exceed double of the diameter of the ball 50. In this way, the force sensors 60 can relatively more effectively sense the abnormally increasing force-receiving signal resulted from the balls 50 pushing two ends of the non-load passages 33.

Figure 5:
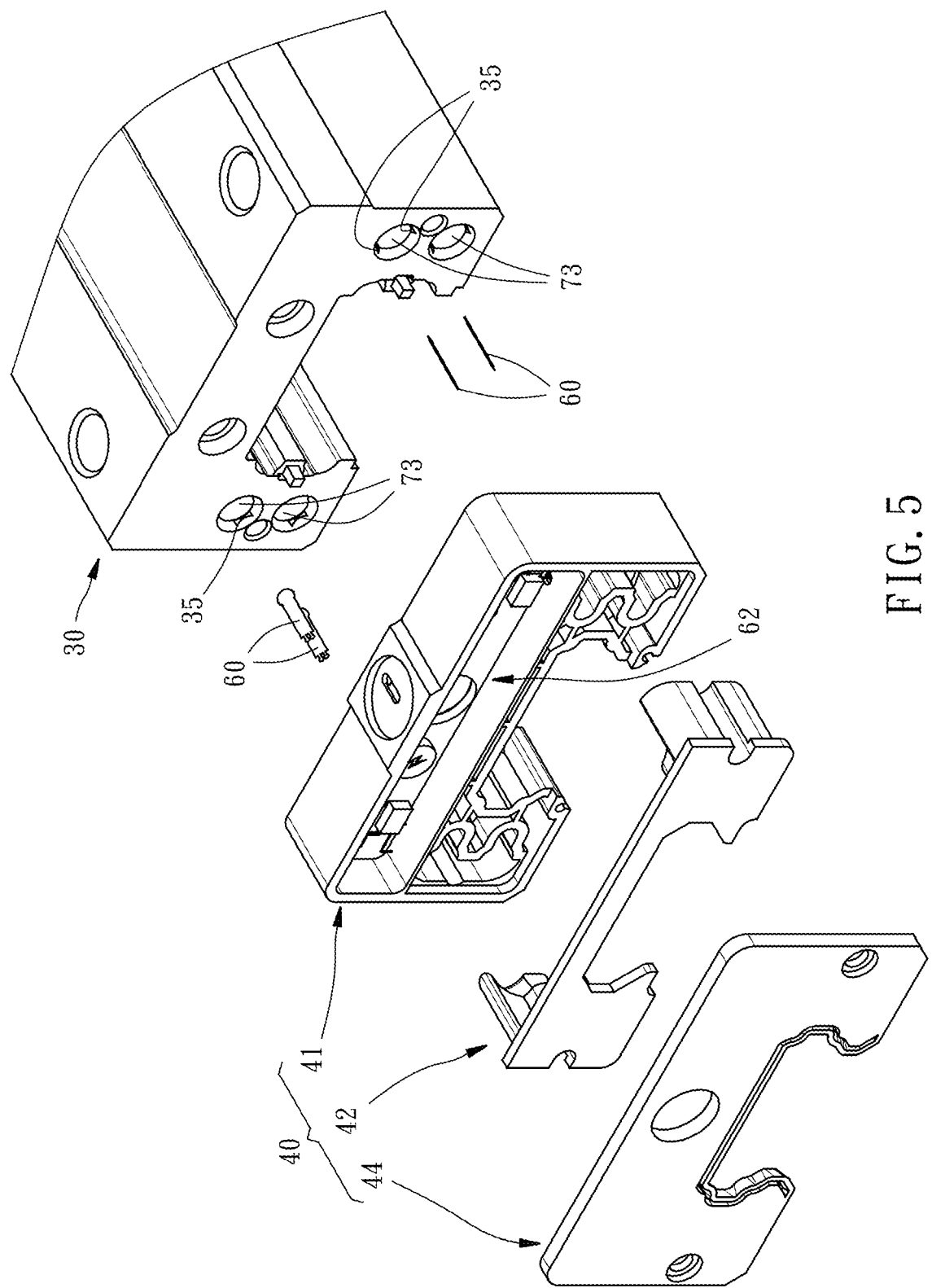
FIG. 5 is a partial exploded perspective view of a linear guideway of a second embodiment of the present invention, but not showing a rail thereof.
Figure 6:
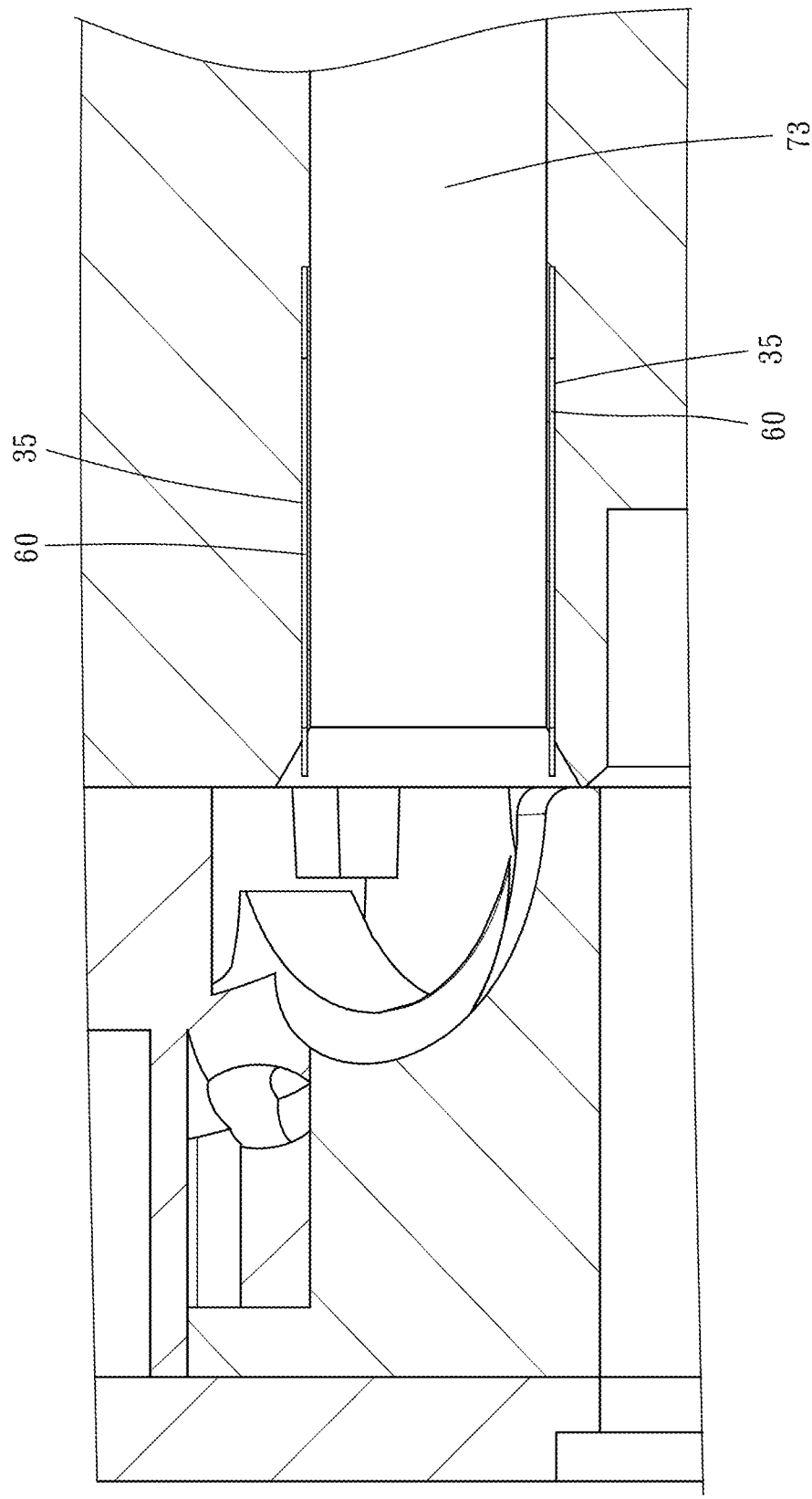
FIG. 6 is a partial sectional view of the linear guideway of the second embodiment of the present invention.

In the above-described first embodiment, the force sensor 60 is indirectly disposed at an end of the non-load passage 33 through the circulation pipe 34. On the other hand, as to the second embodiment of the present invention, the force sensor 60 is directly disposed at an end of the non-load passage 73. Specifically speaking, as shown in FIGS. 5-6, each of two ends of each non-load passage 73 is provided on the inner wall thereof with two embedding troughs 35 opposite to each other. Each of the embedding troughs 35 is provided with a force sensor 60 embedded therein. Such manner can also cause the force sensors 60 to accurately sense the impact force applied to the non-load passages 73 by the balls 50. Preferably, each force sensor 60 is positioned with a distance from an end opening of one non-load passage 73 and the distance is equal to or less than double of the diameter of the ball 50.

In conclusion, in the linear guideway 10 of the present invention, the force sensors 60 are directly or indirectly disposed at two ends of the non-load passages 33(73) to sense that if the alignment of the balls 50 causes an abnormal pushing condition. Compared with the prior arts, the present invention can determine the circulation state more accurately, thereby attaining the effect of pre-diagnosis.

What is claimed is:

1. A linear guideway comprising:
    a rail which is provided on a peripheral surface thereof with two external roll grooves opposite to each other;
    a slider having a slide groove, the slider being slidably disposed on the rail through the slide groove, the slide groove being provided on an inner wall thereof with two internal roll grooves opposite to each other, the internal roll grooves of the slider being located correspondingly to the external roll grooves of the rail so that the internal roll grooves of the slider and the external roll grooves of the rail form two load passages, the slider further having two non-load passages opposite to each other, each of the non-load passages penetrating through two opposite end surfaces of the slider;
    two end caps disposed on said two opposite end surfaces of the slider and each provided with two circulation grooves, two ends of each of the circulation grooves of each of the end caps being communicated with one said load passage and one said non-load passage respectively in a way that two circulation channels are formed and each of the circulation channels is formed by two said circulation grooves, one said load passage and one said non-load passage collectively;
    a plurality of balls disposed in the two circulation channels; and
    a plurality of force sensors disposed at two ends of each of the non-load passages.

2. The linear guideway as claimed in claim 1, wherein each of said two ends of each of the non-load passages is provided on an inner wall thereof with an embedding trough; each of the embedding troughs is provided therein with one said force sensor.

3. The linear guideway as claimed in claim 1, wherein each of the non-load passages is provided therein with a circulation pipe; each of two ends of each of the circulation pipes is connected to one said circulation groove of one said end cap; each of said two ends of each of the circulation pipes is provided on an external peripheral surface thereof with one said force sensor.

4. The linear guideway as claimed in claim 1, wherein each of the force sensors is positioned with a distance from an end opening of one said non-load passage and the distance is equal to or less than double of a diameter of the ball.

* * * * *